United States Patent [19]
Takahashi et al.

[11] Patent Number: 5,559,563
[45] Date of Patent: Sep. 24, 1996

[54] WAVEFORM RESPONSE IMPROVEMENT CIRCUIT

[75] Inventors: Akihito Takahashi; Koji Hasegawa, both of Nagaokakyo, Japan

[73] Assignee: Mitsubishi Denki Kabushiki Kaisha, Tokyo, Japan

[21] Appl. No.: 355,240

[22] Filed: Dec. 9, 1994

[30] Foreign Application Priority Data

Dec. 27, 1993 [JP] Japan .................................. 5-330745

[51] Int. Cl.$^6$ .................................................. H04N 5/208
[52] U.S. Cl. .......................................................... 348/625
[58] Field of Search ...................................... 348/606, 620, 348/625, 627, 630, 631; H04N 5/208, 5/21

[56] References Cited

U.S. PATENT DOCUMENTS

| | | | |
|---|---|---|---|
| 5,151,787 | 9/1992 | Park | 348/625 |
| 5,404,180 | 4/1995 | Kitano et al. | 348/625 |

FOREIGN PATENT DOCUMENTS

| | | |
|---|---|---|
| 558017A2 | 9/1993 | European Pat. Off. . |
| 63-292776 | 11/1988 | Japan . |

*Primary Examiner*—Safet Metjahic
*Assistant Examiner*—Sherrie Hsia

[57] ABSTRACT

A waveform response improvement circuit including first to fourth delay circuits for sequentially delaying an input signal by respective predetermined delay times, circuits for obtaining an inverted signal of a signal indicative of increase/decrease of the vicinity of an output signal of the second delay circuit, a first amplitude adjust circuit for adjusting the amplitude of the signal, a maximum value selection circuit and a minimum value selection circuit for selecting the maximum and minimum values from output signals of the delay circuits, third and fourth subtracting circuits for respectively subtracting the output signal of the second delay circuit from the maximum value and minimum value signals, an intermediate value selection circuit for selecting the intermediate value from output signals of the amplitude adjust circuit, and the third and fourth subtracting circuits, second amplitude adjust circuit for adjusting the amplitude of the output signal, and a second adding circuit for adding an output signal of the amplitude adjust circuit and that of the second delay circuit. The circuit is prevented from erroneously operating even when an input signal has a small amplitude and decoloration is prevented from occurring even when an input signal has a small area.

16 Claims, 16 Drawing Sheets

PRIOR ART

FIG. 3(f)     TERMINAL a / TERMINAL b / TERMINAL c

TERMINAL a
TERMINAL b
TERMINAL c g(t)

FIG. 10( a ) 1 a 
FIG. 10( b ) 2 a 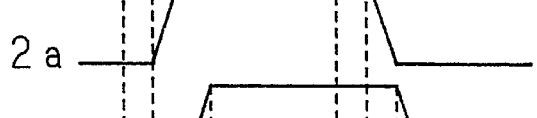
FIG. 10( c ) 3 a 
FIG. 10( d ) 4 a 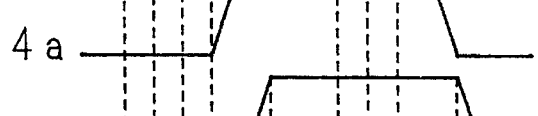
FIG. 10( e ) 5 a 
FIG. 10( f ) 3 a−1 a = 6 a 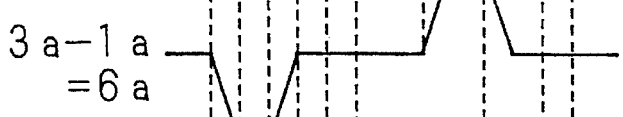
FIG. 10( g ) 3 a−5 a = 7 a 
FIG. 10( h ) (3 a−1 a)+(3 a−5 a) = 8 a 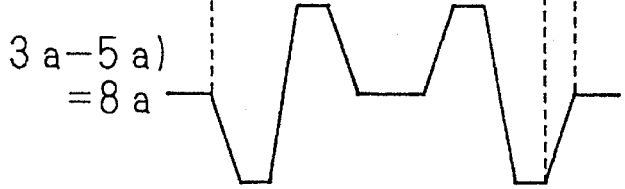

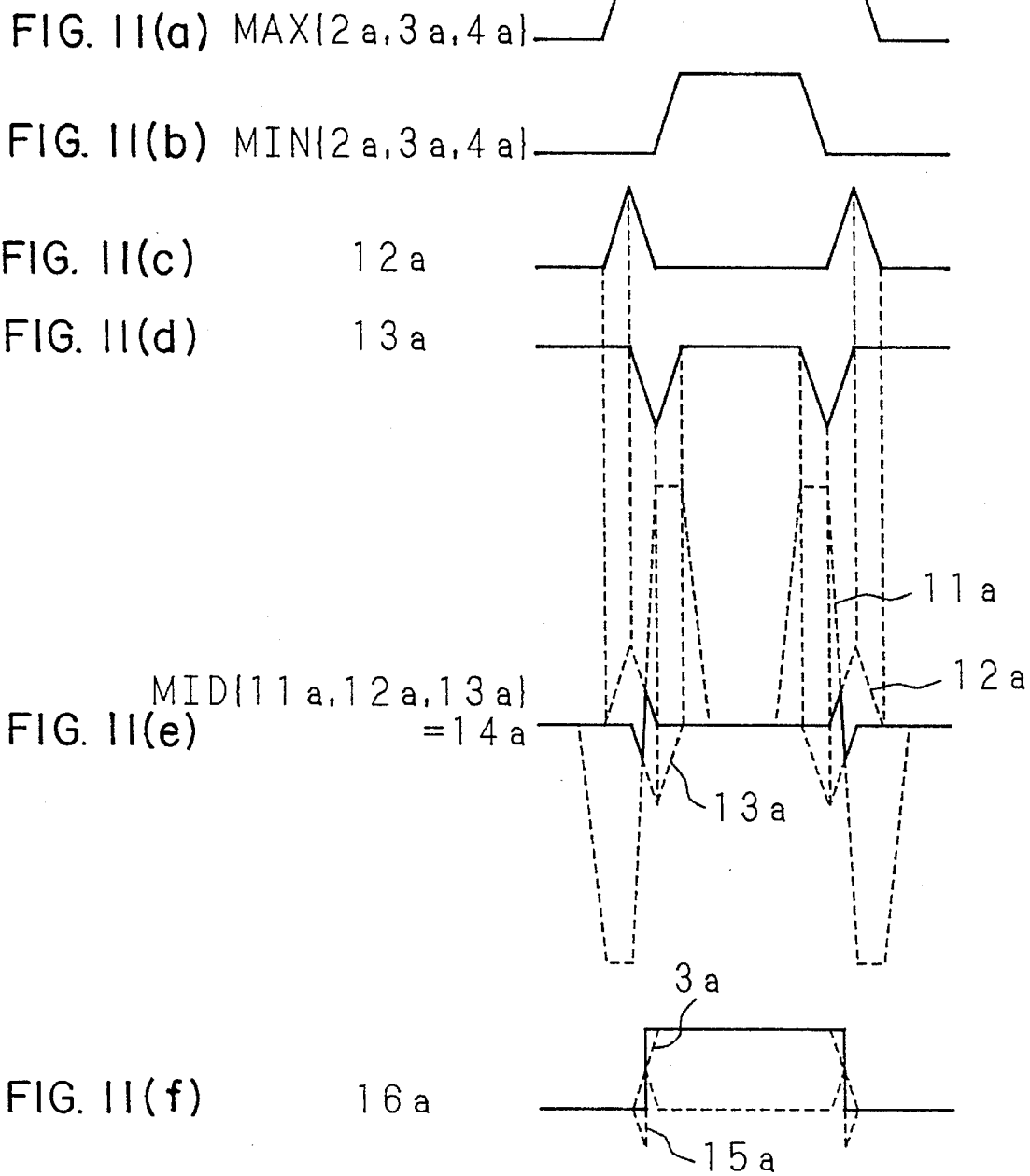

FIG. 12(f)   3a−1a
             =6a 
FIG. 12(g)   3a−5a
             =7a 
FIG. 12(h)   (3a−1a)+(3a−5a)
             =8a 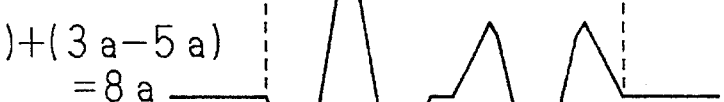

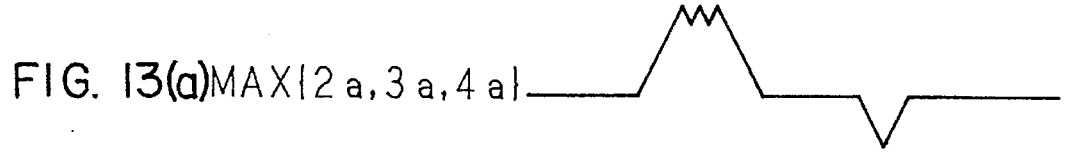
FIG. 13(a) MAX{2a,3a,4a}
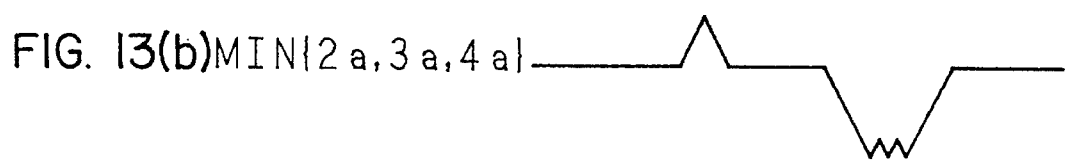
FIG. 13(b) MIN{2a,3a,4a}
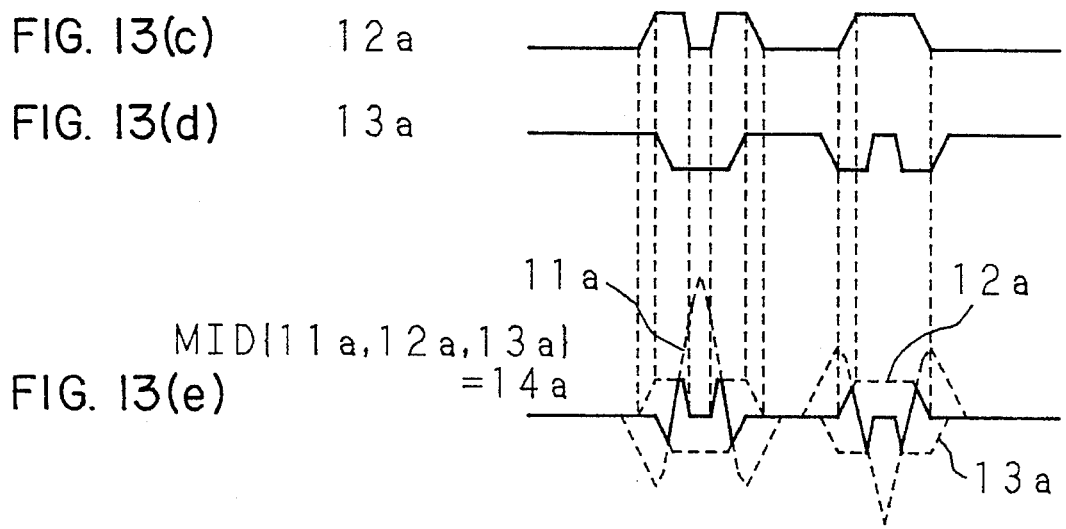
FIG. 13(c) 12a
FIG. 13(d) 13a
FIG. 13(e) MID{11a,12a,13a} = 14a
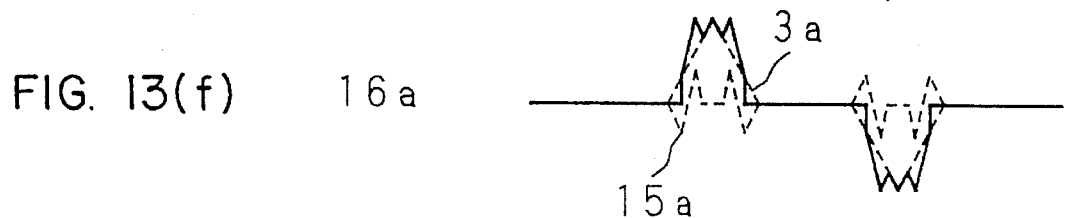
FIG. 13(f) 16a

WAVEFORM RESPONSE IMPROVEMENT CIRCUIT

BACKGROUND OF THE INVENTION

1. Field of the Invention

The invention relates to a waveform response improvement circuit which is used in an image signal processing of a video tape recorder or the like.

2. Description of the Related Art

FIG. 1 is a block diagram showing an example of a conventional waveform response improvement circuit, which is disclosed in, for example, Japanese Patent Application Laid-Open No. 63-292776(1988). An input signal inputted from an input terminal 33n is delayed in a first, delay circuit 33 by a fixed time D, and then further delayed in a second delay circuit 34 by the same fixed time D. In a subtracting circuit 35, the input signal is subtracted from an output signal of the first delay circuit 33, and an absolute value of the resulting signal is then obtained by an absolute value circuit 37. In a subtracting circuit 36, similarly, an output signal of the second delay circuit 34 is subtracted from the output signal of the first delay circuit 33, and an absolute value of the resulting signal is then obtained by an absolute value circuit 38.

An output signal 37a of the absolute value circuit. 37 and an output signal 38a of the absolute value circuit 38 are compared with each other in a comparator 39. On the basis of a comparison result, a changeover switch 40 is controlled so that either of the input signal (terminal a), the output signal of the first delay circuit 33 (terminal b) and the output signal of the second delay circuit 34 (terminal c) is selected, and the selected signal is outputted from an output terminal 41.

FIG. 2 is a circuit diagram showing a configuration example of the absolute value circuits 37 and 38 shown in FIG. 1. Collectors of transistors 55 and 57 are respectively connected through resistors R1 to power sources 54 and 56, and emitters of the transistors 55 and 57 are connected through resistors R2 to a constant current source 62, thereby constituting a differential amplifier circuit. A constant voltage from a constant voltage source 61 is applied to the base of the transistor 57, and an input voltage A to the base of the transistor 55.

Collectors of transistors 59 and 60 are connected to a power source 58, and emitters of the transistors 59 and 60 are connected to a constant current source 63, thereby constituting an emitter follower circuits. An output of above-mentioned differential amplifier circuit is inputted to the bases of the transistors 59 and 60. Specifically, a noninverted signal of the input voltage A is input ted to the base of the transistor 59, and an inverted signal of the input voltage A to the base of the transistor 60.

When the input voltage A is positive, therefore, a positive noninverted signal of the input voltage. A is inputted to the base of the transistor 59, and a negative inverted signal of the input voltage A to the base of the transistor 60, resulting in that only the transistor 59 to which a higher voltage is inputted is turned on, and the positive noninverted signal of the input voltage A is outputted from the emitter. In contrast, when the input voltage A is negative, a negative noninverted signal of the input voltage A is inputted to the base of the transistor 59, and a positive inverted signal of the input voltage A to the base of the transistor 60, resulting in that only the transistor 60 to which a higher voltage is inputted is turned on and the positive inverted signal of the input voltage A is outputted from the emitter. Irrespective of the polarity of the input voltage A, consequently, the absolute value of the input voltage A is outputted.

An operation of the conventional waveform response improvement circuit thus configured will be described. When the output signal of the first delay circuit 33 is indicated by f(t), the input signal at the input terminal 33n is expressed by f(t–D), and the output signal of the second delay circuit 34 by f(t+D). FIG. 3(a), FIG. 3(b) and FIG. 3(c) or FIG. 4(a), FIG. 4(b) and FIG. 4(c) show a timing chart illustrating relative positional relationships of these signal examples. The signals f(t–D), f(t) and f(t+D) are shifted by the fixed time D in this example.

The subtracting circuit 35 every time calculates [amplitude of signal f(t)]–[amplitude of signal f(t–D)], and the absolute value circuit 37 outputs the signal 37a (FIG. 3(d), FIG. 4(d) indicative of the absolute value of a calculation result. Similarly, the subtracting circuit 36 every time calculates [amplitude of signal f(t)]–[amplitude of signal f(t+D)], and the absolute value circuit 38 outputs the signal 38a (FIG. 3(e), FIG.4(e)) indicative of the absolute value of a calculation result.

The comparator 39 compares the absolute value signal 37a with the absolute value signal 38a. As shown in a switching operation of FIG. 3(f) or FIG.4(f), when the signal 37a is smaller than the signal 38a (37a<38a), the changeover switch 40 is switched to the terminal a so that the signal f(t–D)) is outputted, when the signal 37a is equal to the signal 38a (37a=38a), the changeover switch 40 is switched to the terminal b so that the signal f(t) is outputted, and when the signal 37a is larger than the signal 38a (37a>38a), the changeover switch 40 is switched to the terminal c so that the signal f(t+D) is outputted.

As a result, a signal g(t) shown in FIG. 3(g) or FIG. 4(g) is outputted from the output terminal 41. The signal g(t) has a waveform obtained by correcting the color signal f(t) having a slow (gentle) rising to a waveform having a rapid (steep) rising. At the rising of the color signal, therefore, the rising time is shortened, and, at the falling of the color signal, the falling time is shortened.

In the conventional waveform response improvement circuit, there arises no problem when the amplitude of the input signal is sufficiently large. When the amplitude of the an input signal is small and lower than the threshold voltages of the comparator and the changeover switch, however, the circuit may erroneously operate. In the case where an area (area=amplitude=time) of the input signal is small, for example, the input signal f(t) shown in FIG. 4(b) may be changed to a signal g(t) shown in FIG. 3(g), thereby causing decoloration. In the current status of the art, a waveform response improvement circuit cannot always operate normally and fails to sufficiently exhibit its function.

SUMMARY OF THE INVENTION

The invention has been devised in view of the abovementioned circumstances. It is an object of the invention to provide a waveform response improvement circuit which comprises means for emphasizing an unevenness tendency of portions of a signal waveform excluding maximal and minimal portions, whereby the circuit is prevented from erroneously operating even when an input signal has a small amplitude, and decoloration is prevented from occurring even when an input signal has a small area.

According to a first aspect of the invention, the waveform response improvement circuit comprises: first, second, third and fourth delaying means for sequentially delaying an input, image signal by respective one of first, second, third and fourth times; means for obtaining an inverted signal of a signal indicative of increase/decrease of change in the range including an output signal of the second delaying means; first amplitude adjusting means for adjusting the amplitude of the inverted signal of the signal i indicative of increase/decrease of change; maximum value selecting means for selecting the maximum value from output signals of the first, second and third delaying means; minimum value selecting means for selecting the minimum value from the output signals of the first, second and third delaying means; third subtracting means for subtracting the output signal of the second delaying means from an output signal of the maximum value selecting means; fourth subtracting means for subtracting the output signal of the second delaying means from an output signal of the minimum value selecting means; intermediate value selecting means for selecting the intermediate value from output signals of the first amplitude adjusting means and the third and fourth subtracting means; second amplitude adjusting means for adjusting the amplitude of an output signal of the intermediate value selecting means; and second adding means for adding an output signal of the second amplitude adjusting means and that of the second delaying means, and for outputting the resulting signal as an improved image signal.

According to a second aspect of the invention, in addition to the configuration of the waveform response improvement circuit of the first aspect, the first time is equal to the fourth time, and the second time is equal to the third time.

According to a third aspect of the invention, in addition to the configuration of the waveform response improvement circuit of the second aspect, a sum of the first time and the second time is equal to a sum of the third time and the fourth time, the second time is equal to the third time, and the circuit further comprises adjustment controlling means for, when one of the first to fourth times is set, setting all the first to fourth times.

In the first aspect of the waveform response improvement circuit of the invention, first subtracting means subtracts the input signal from the output signal of the second delaying means, to obtain a change from the output signal of the second delaying means to the input signal. Similarly, second subtracting means subtracts the output signal from the fourth delaying means from the output signal of the second delaying means, to obtain an inverted signal of a change from the output signal of the fourth delaying means to the output signal of the second delaying means. First adding means then adds the output signal of the first subtracting means and the output signal of the second subtracting means, to obtain an inverted signal of a signal indicative of increase/decrease of change in the range including an output signal of the second delaying means. The first amplitude adjusting means adjusts the amplitude of the inverted signal of the signal indicative of increase/decrease of change.

On the other hand, the third subtracting means subtracts the output signal of the second delaying means from the maximum value of the output signals among the first, second and third delaying means, and outputs a positive or 0 signal. Similarly, the fourth subtracting means subtracts the output signal of the second delaying means from the minimum value of the output signals among the first, second and third delaying means, and outputs a negative or 0 signal.

Next, the intermediate value selecting means selects the intermediate value from the output signals of the first amplitude adjusting means, the third subtracting means and the fourth subtracting means, thereby selecting a positive signal when the signal waveform in abovementioned range is upward convex, a negative signal when the signal waveform is downward convex, and a 0 signal in the other case. The second amplitude adjusting means adjusts the amplitude of the selected intermediate value signal, and outputs the adjusted signal to the second adding means.

The second adding means adds the output signal of the second amplitude adjusting means and that of the second delaying means, thereby adding the output signal of the second amplitude adjusting means to the output signal of the second delaying means when the signal waveform in abovementioned range is upward convex, subtracting the absolute value of the output signal of the second amplitude adjusting means from the output signal of the second delaying means when the signal waveform in abovementioned range is downward convex, and outputting the output signal of the second delaying means as it is in the other case, as an improved image signal.

According to the waveform response improvement circuit of the second aspect of the invention, in the operation of the waveform response improvement circuit of the first aspect, the first time is equal to the fourth time, and the second time is equal to the third time, so that waveforms of the rising and falling edges of the output signals of the maximum value selecting means and the minimum value selecting means are laterally symmetric.

According to the waveform response improvement circuit of the third aspect of the invention, in the operation of the waveform response improvement circuit of the second aspect, when one of the first to fourth times is set, the adjustment controlling means sets all the first to fourth times while setting a sum of the first time and the second time to be equal to that of the third time and the fourth time, and the second time to be equal to the third time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3(a)–3(g) are timing charts showing waveforms of each portion of the conventional waveform response improvement circuit;

FIGS. 10(a)–10(h) are timing charts showing waveforms of each portion of the first aspect of the waveform response improvement circuit of the invention;

FIGS. 11(a)–11(f) are timing charts showing waveforms of each portion of the first aspect of the waveform response improvement circuit of the invention;

FIGS. 12(a)–12(h) are timing charts showing waveforms of each portion of the first aspect of the waveform response improvement circuit of the invention;

FIGS. 13(a)–13(f) are timing charts showing waveforms of each portion of the first aspect of the waveform response improvement circuit of the invention;

DESCRIPTION OF THE PREFERRED EMBODIMENTS

Hereinafter, embodiments of the waveform response improvement circuit of the invention will be described with reference to the drawings showing them.

Figure 5:
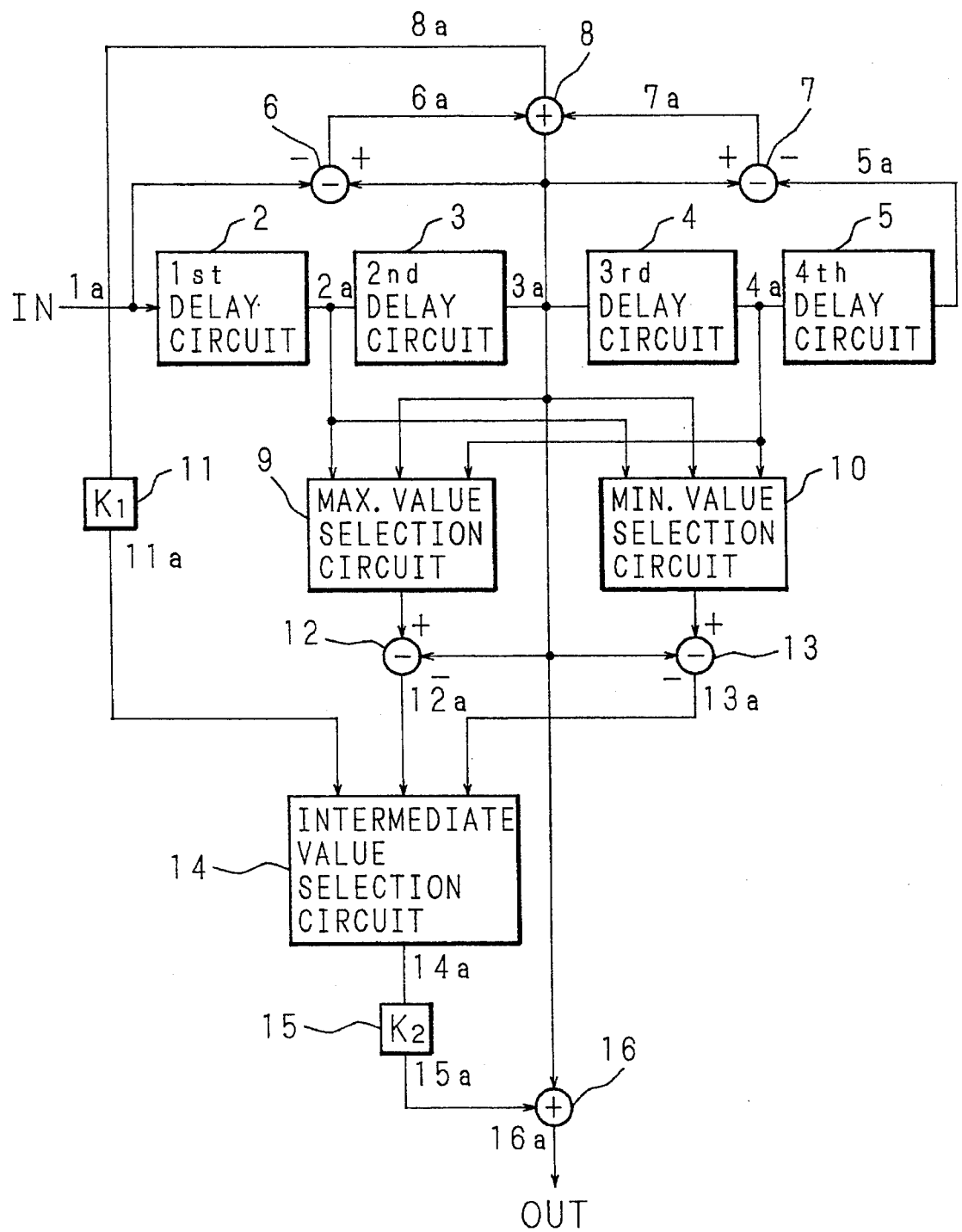
FIG. 5 is a block diagram showing an embodiment according to the first aspect of the waveform response improvement circuit of the invention.

FIG. 5 is a block diagram showing an embodiment according to the first aspect of the waveform response improvement circuit of the invention. An input signal which is an image signal inputted from an input terminal IN is delayed in a first delay circuit 2 by a first time D1, and then further delayed in a second delay circuit 3 by a second time D2. Furthermore, the signal is sequentially delayed in a third delay circuit 4 by a third time D3, and in a fourth delay circuit 5 by a fourth time D4.

At the same time, a first subtracting Circuit 6 subtracts the input signal 1a from an output signal 3a of the second delay circuit 3, a second subtracting circuit 7 subtracts an output signal 5a of the fourth delay circuit 5 from the output signal 3a of the second delay circuit 3, a first adding circuit 8 adds an output signal 6a of the first subtracting circuit 6 and an output signal 7a of the second subtracting circuit 7, and a first amplitude adjust circuit 11 outputs an output signal 11a which is obtained by multiplying the amplitude of an output signal 8a of the first adding circuit 8 by an arbitrary constant K1.

A maximum value selection circuit 9 outputs the maximum value among the output signals 2a, 3a and 4a of the first, second and third delay circuits 2, 3 and 4. A third subtracting circuit 12 subtracts the output signal 3a of the second delay circuit 3 from the maximum value. A minimum value selection circuit 10 outputs the minimum value among the output signals 2a, 3a and 4a of the first, second and third delay circuits 2, 3 and 4. A fourth subtracting circuit 13 subtracts the output signal 3a of the second delay circuit 3 from the minimum value.

An intermediate value selection circuit 14 selects the intermediate value from output signals 11a, 12a and 13a of the first amplitude adjust circuit 11, the third subtracting circuit 12, and the fourth subtracting circuit. 13. A second amplitude adjust circuit 15 outputs an output signal 15a which is obtained by multiplying the amplitude of the intermediate value signal 14a by an arbitrary constant K2. A second adding circuit 16 outputs an output signal 16a which is obtained by adding the output signal 15a of the second amplitude adjust circuit 15 and the output signal 3a of the second delay circuit 3, from an output terminal OUT.

Figure 6:
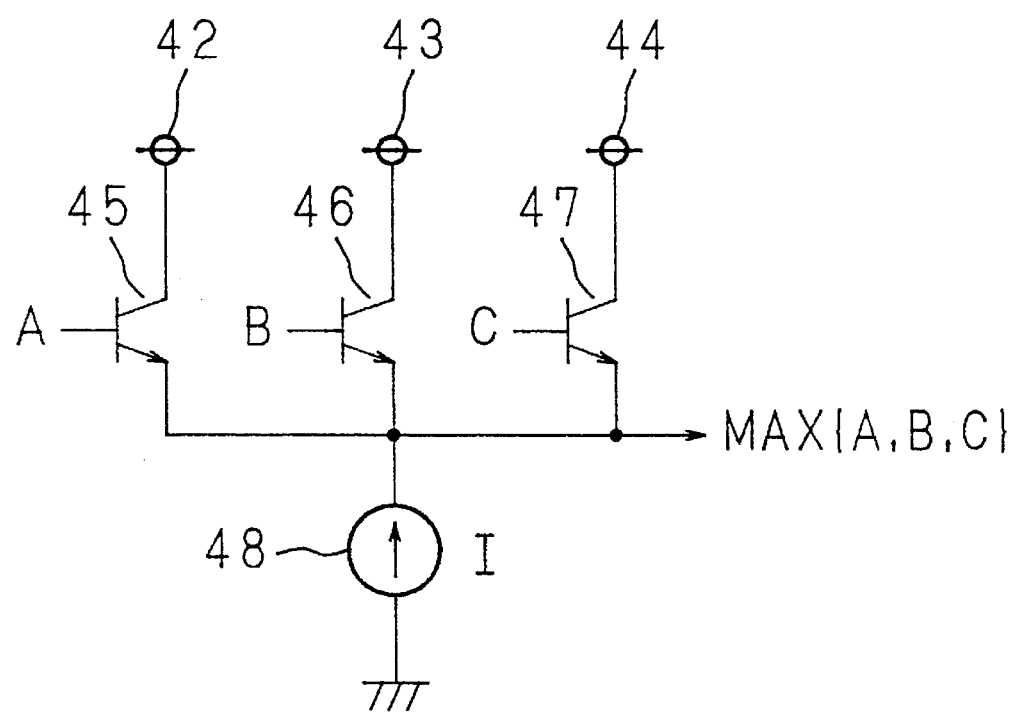
FIG. 6 is a circuit diagram showing a configuration example of a maximum value selection circuit shown in FIG. 5.

FIG. 6 is a circuit diagram showing a configuration example of the maximum value selection circuit 9 shown in FIG. 5. The collectors of NPN transistors 45, 46 and 47 whose emitters are commonly connected to each other are connected to power sources 42, 43 and 44, respectively. The commonly connected emitters are coupled to one terminal of a constant current source 48 whose other terminal is grounded. Signal voltages A, B and C which are to be compared with each other are inputted to the bases of the transistors 45, 46 and 47, respectively. Among the transistors 45, 46 and 47, the one to whose base the highest signal voltage is applied is turned on, and the maximum voltage is applied to the commonly connected emitters. The remaining transistors are not turned on because their emitter voltages become higher than the respective base voltages. As a result, the maximum voltage is outputted from the commonly connected emitters.

Figure 7:
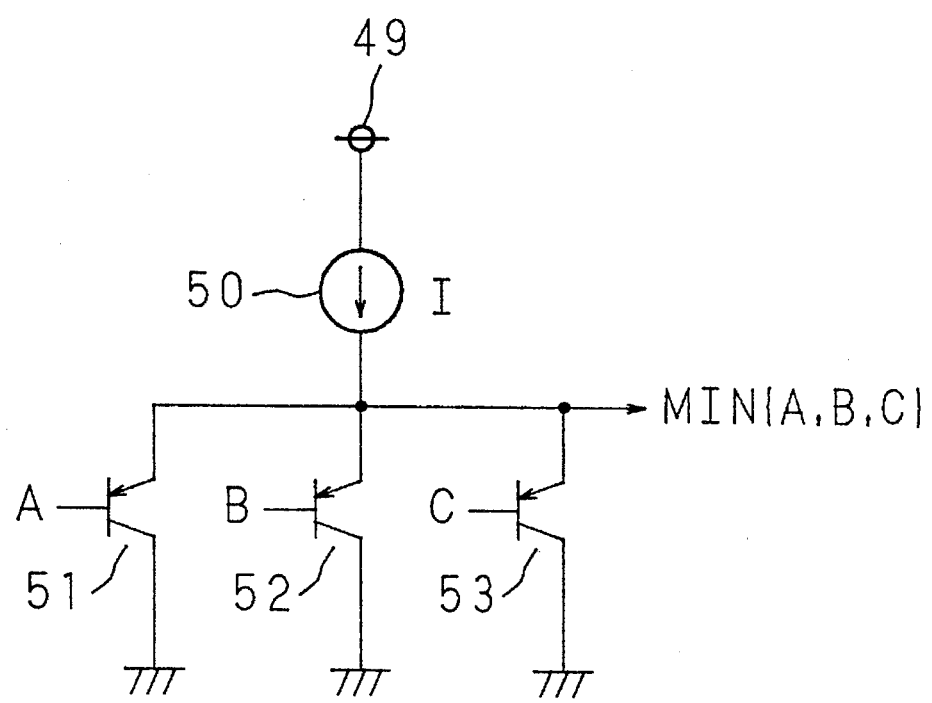
FIG. 7 is a circuit diagram showing a configuration example of a minimum value selection circuit shown in FIG. 5.

FIG. 7 is a circuit diagram showing a configuration example of the minimum value selection circuit 10 shown in FIG. 5. The collectors of PNP transistors 51, 52 and 53 whose emitters are commonly connected to each other are grounded. The commonly connected emitters are coupled to one terminal of a constant current source 50 whose other terminal is connected to a power source 49. The signal voltages A, B and C which are to be compared with each other are inputted to the bases of the transistors 51, 52 and 53, respectively. Among the transistors 51, 52 and 53, the one to whose base the minimum signal voltage is applied is turned on, and the minimum voltage is applied to the commonly connected emitters. The remaining transistors are not turned on because their emitter voltages are lower than the respective base voltages. As a result, the minimum voltage is outputted from the commonly connected emitters.

Figure 8:
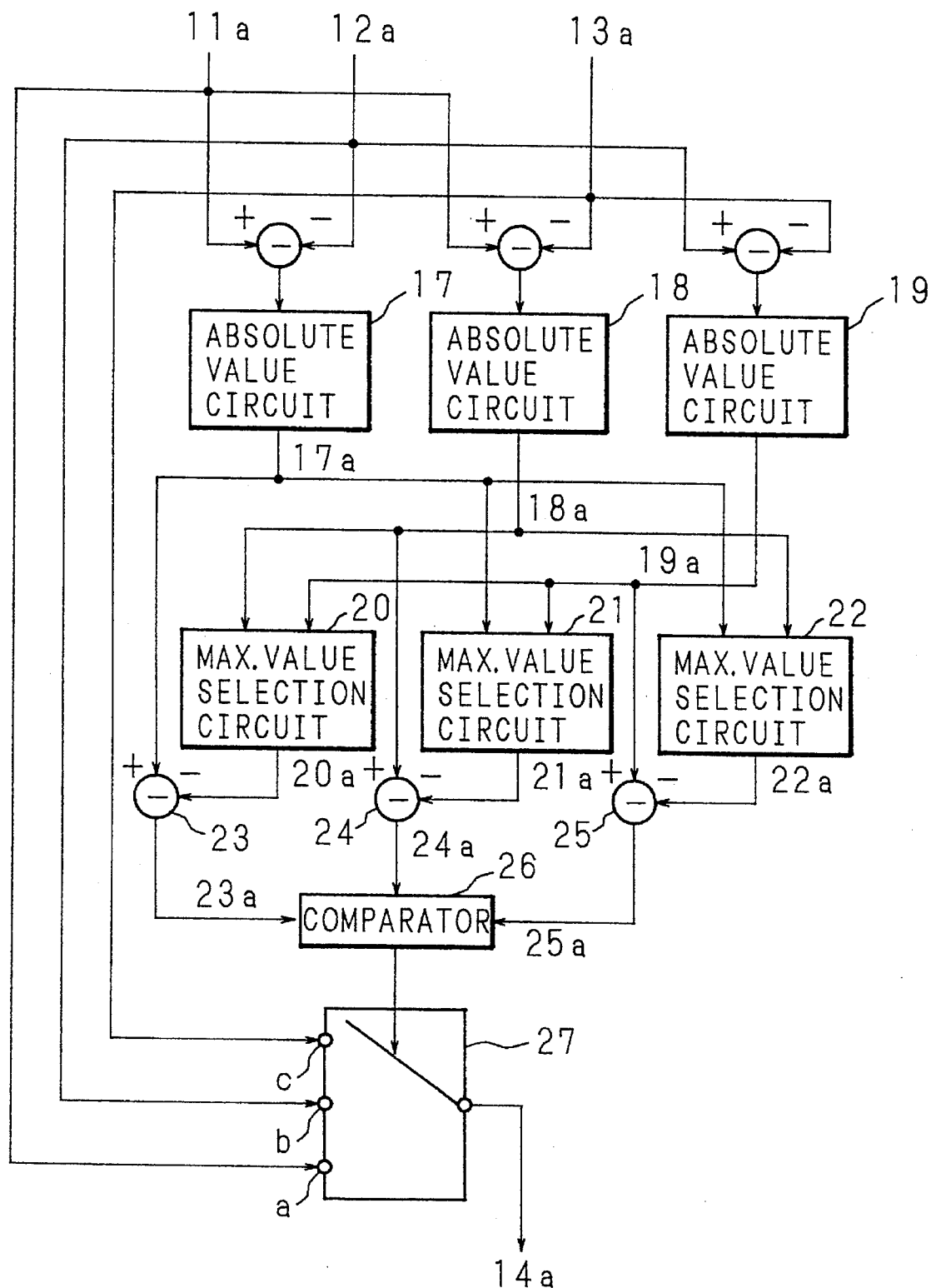
FIG. 8 is a block diagram showing a configuration example of an intermediate value selection circuit shown in FIG. 5.

FIG. 8 is a block diagram showing a configuration example of the intermediate value selection circuit 14 shown in FIG. 5.

An absolute value circuit 17 obtains a signal 17a of the absolute value of the difference between the output signal 11a of the first amplitude adjust circuit 11 and the output signal 12a of the third subtracting circuit 12. An absolute value circuit 18 obtains a signal 18a of the absolute value of the difference between the output signal 11a of the first amplitude adjust circuit 11 and the output signal 13a of the fourth subtracting circuit 13. An absolute value circuit 19 obtains a signal 19a of the absolute value of the difference between the output signal 12a of the third subtracting circuit 12 and the output signal 13a of the fourth subtracting circuit 13.

Next, a maximum value selection circuit, 20, which is configured in the same manner as that of FIG. 6 but has two signal inputs, obtains a signal 20a corresponding to one of the absolute value signals 18a and 19a whichever is larger. A maximum value selection circuit 21 obtains a signal 21a corresponding to one of the absolute value signals 17a and 19a whichever is larger. A maximum value selection circuit 22 obtains a signal 22a corresponding to one of the absolute value signals 17a and 18a whichever is larger.

A subtracting circuit 23 obtains a signal 23a of a difference between the absolute value signal 17a and the signal 20a, a subtracting circuit 24 obtains a signal 24a of a difference between the absolute value signal 18a and the signal 21a, and a subtracting circuit 25 obtains a signal 25a of a difference between the absolute value signal 19a and the signal 22a.

A comparator 26 switches a changeover switch 27 to a terminal a to output the signal 11a when the signal 23a is positive, to a terminal b to output the signal 12a when the signal 24a is positive, and to a terminal c to output the signal 13a when the signal 25a is positive. As a result, the signal 14a of to the intermediate value among the signals 11a, 12a and 13a is selected.

Figure 1:
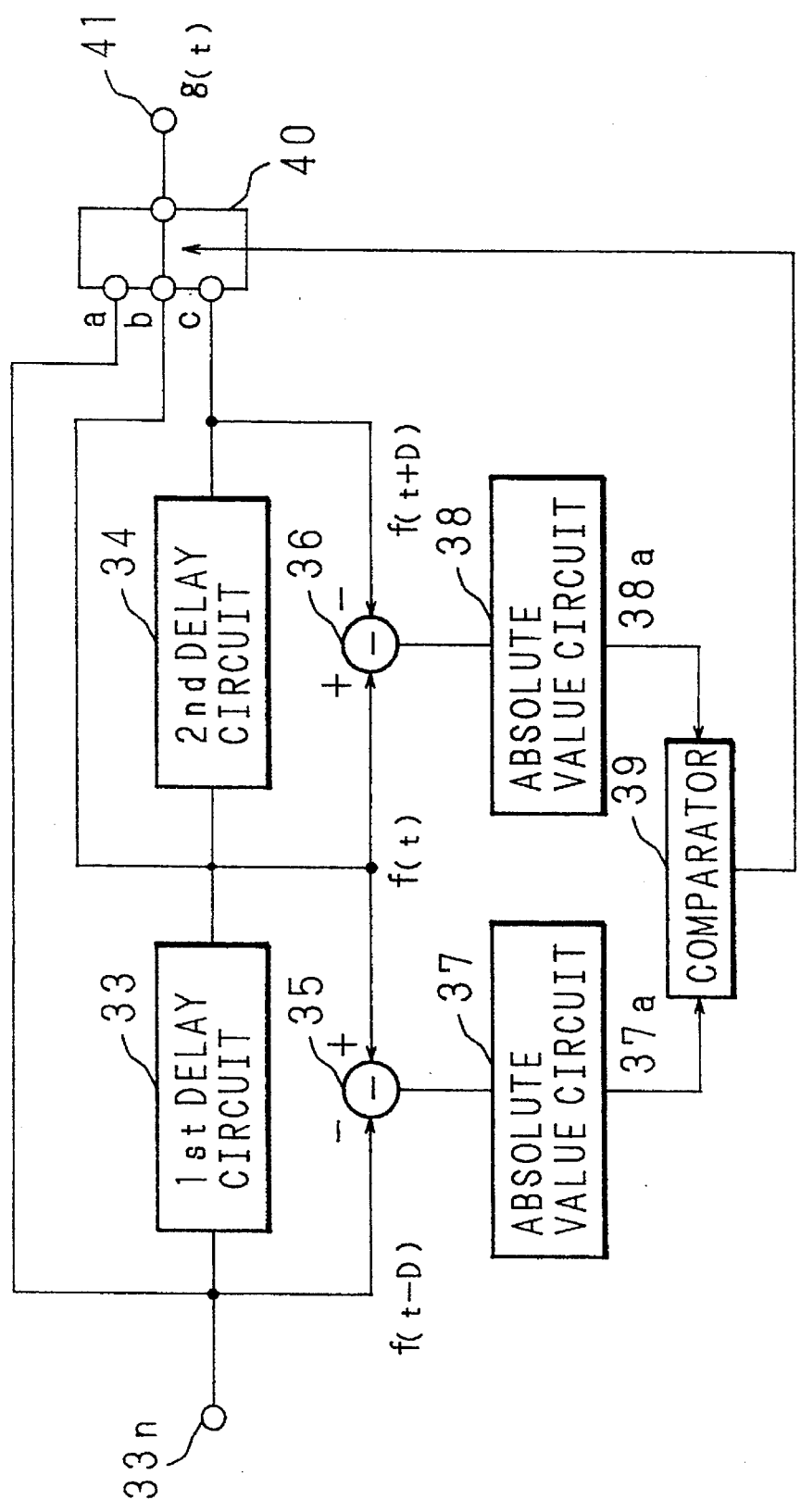
FIG. 1 is a block diagram showing an example of a conventional waveform response improvement circuit.
Figure 2:
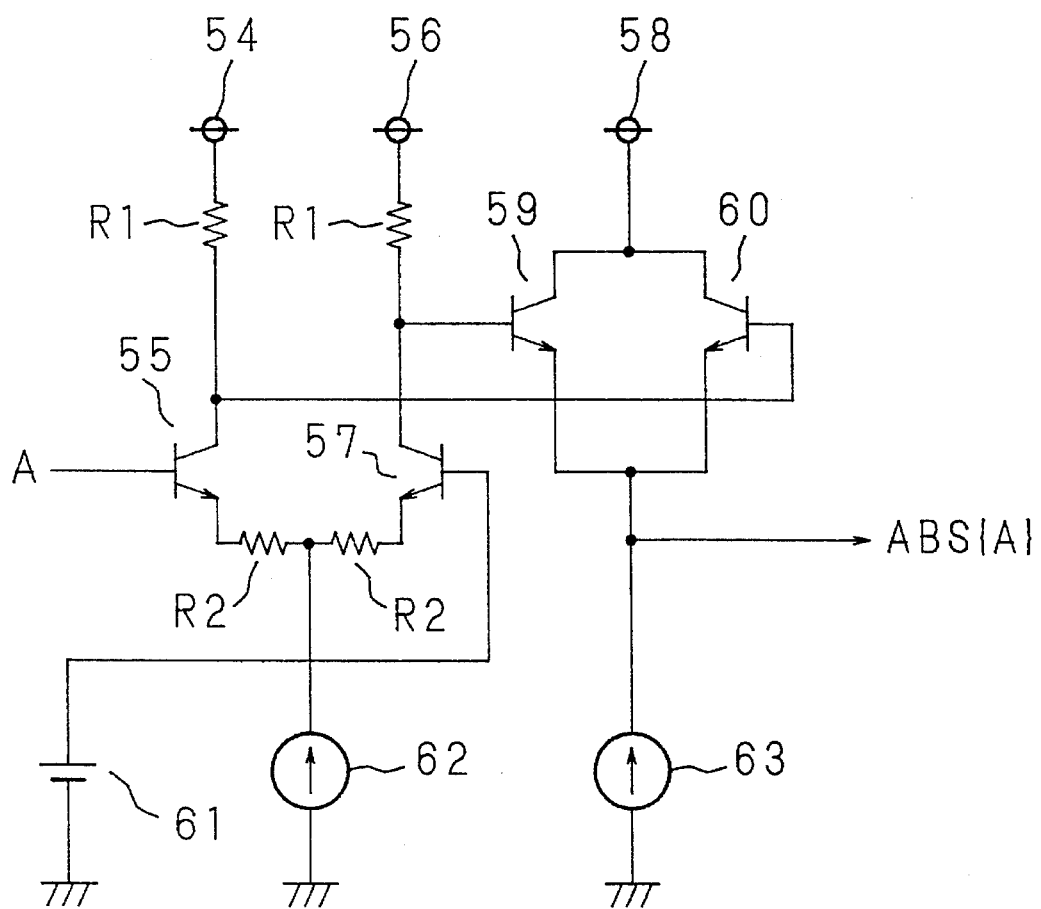
FIG. 2 is a circuit diagram showing a configuration example of an absolute value circuit used in the prior art and the invention.
Figure 4A:
FIGS. 4(a)–4(g) are timing charts showing waveforms of each portions of the conventional waveform response improvement circuit.
Figure 4B:
Figure 4C:
Figure 4D:
Figure 4E:
Figure 4F:
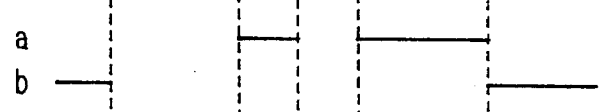
Figure 4G:

A configuration example of the absolute value circuits 17, 18 and 19 shown in FIG. 8 is the same as that of the conventional example shown in FIG. 2. The collectors of transistors 55 and 57 are respectively connected through resistors R1 to power sources 54 and 56, and the emitters of the transistors 55 and 57 are connected through resistors R2 to a constant current source 62, thereby constituting a differential amplifier circuit. A constant voltage from a constant voltage source 61 is applied to the base of the transistor 57, and an input voltage A to the base of the transistor 55.

The collectors of transistors 59 and 60 are connected to a power source 58, and the emitters of the transistors 59 and 60 are connected to a constant current source 63, thereby constituting an emitter follower circuit Output of abovementioned differential amplifier circuit is inputted to the bases of the transistors 59 and 60. Specifically, a noninverted signal of the input voltage A is inputted to the base of the transistor 59, and an inverted signal of the input voltage A to the base of the transistor 60.

When the input voltage A is positive, therefore, a positive noninverted signal of the input voltage A is inputted to the base of the transistor 59, and a negative inverted signal of the input voltage A to the base of the transistor 60, resulting in that only the transistor 59 to which a higher voltage is inputted is turned on, an the positive noninverted signal of the input voltage A i outputted from the emitter. In contrast, when the input voltage A is negative, a negative noninverted signal of the input voltage A is inputted to the base of the transistor 59, and a positive inverted signal of the input voltage A to the base of the transistor 60, resulting in that only the transistor 60 to which a higher voltage is inputted is turned on, and the positive inverted signal of the input voltage A is outputted from the emitter. Irrespective of the polarity of the input voltage A, consequently, the absolute value of the input voltage A is outputted.

Figure 9:
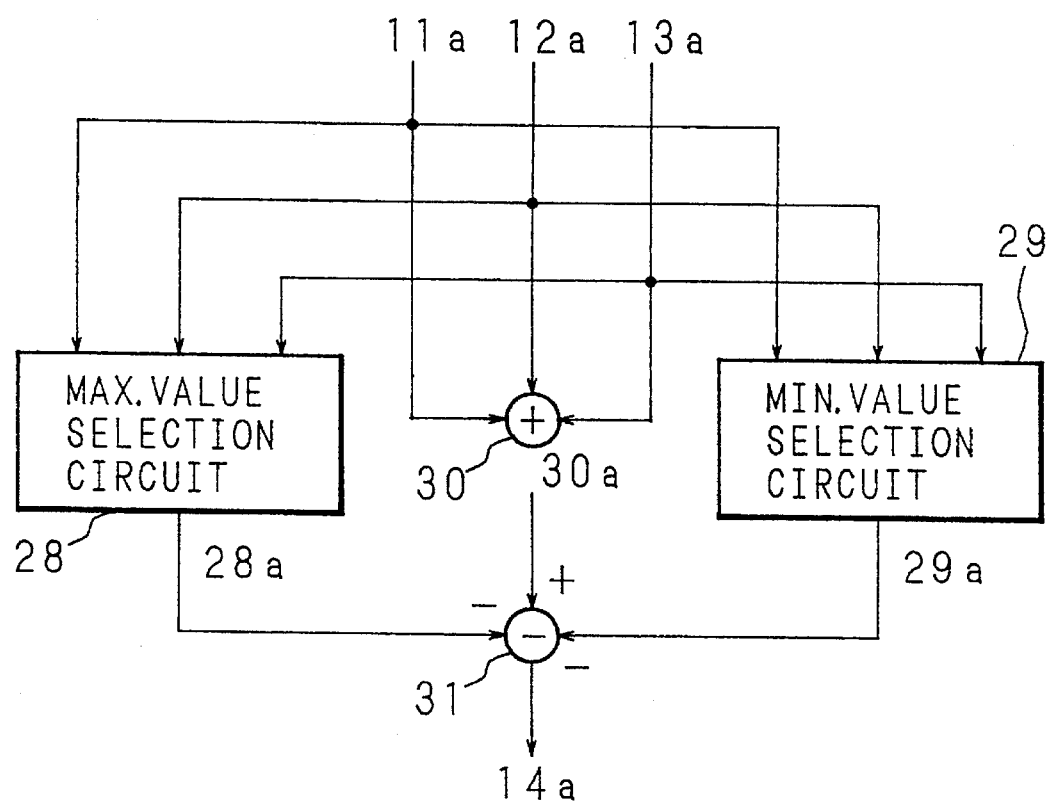
FIG. 9 is a block diagram showing another configuration example of the intermediate value selection circuit shown in FIG. 5.

FIG. 9 is a block diagram showing another configuration example of the intermediate value selection circuit 14 shown in FIG. 5 which is different from that shown in FIG. 8. An adding circuit 30 obtains a signal 30a of a sum of the output signal 11a of the first amplitude adjust circuit 11, the output signal 12a of the third subtracting circuit 12 and the output signal 13a of the fourth subtracting circuit 13. A maximum value selection circuit 28 which is configured in the same manner as that of FIG. 6 obtains a maximum value signal 28a, and a minimum value selection circuit 29 which is configured in the same manner as that of FIG. 7 obtains a minimum value signal 29a.

A subtracting circuit 31 then subtracts the maximum value signal 28a and the minimum value signal 29a from the sum signal 30a, to output a signal 14a of the intermediate value of the signals 11a, 12a and 13a.

Hereinafter, the operation of the waveform response improvement circuit thus configured will be described with reference to FIGS. 10(a)–10(h), FIGS. 11(a)–11(f) (the case of a large signal), FIGS. 12(a)–12(h) and FIGS. 13(a)–13(f) (the case of a signal of a small area) which show waveforms of various portions.

Figure 12A:
Figure 12B:
Figure 12C:
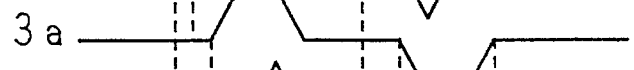
Figure 12D:
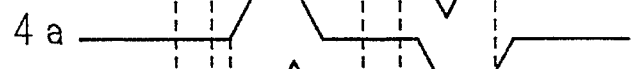
Figure 12E:

An input signal 1a (FIG. 10(a) and FIG. 12(a)) which is an image signal received at the input terminal IN is delayed in the first delay circuit 2 by the first time D1, and then further delayed in the second delay circuit 3 by the second time D2. Furthermore, the signal is sequentially delayed in the third delay circuit 4 by the third time D3, and in the fourth delay circuit 5 by the fourth time D4 (FIG. 10(b) to FIG. 10e and FIG. 12(b) to FIG. 12(e)).

At the same time, the first subtracting circuit 6 subtracts the input signal 1a from the output signal 3a of the second delay circuit 3, to obtain the signal 6a (FIG. 10f) and FIG. 12(f)). The second subtracting circuit 7 subtracts the output signal 5a of the fourth delay circuit 5 from the outpost signal 3a of the second delay circuit 3, to obtain the signal 7a (FIG. 10(g) and FIG. 12(g)). The first adding circuit 8 adds the output signal 6a of the first subtracting circuit 6 and the output signal 7a of the second subtracting circuit 7 (FIG. 10(h) and FIG. 12(h)), to obtain an inverted waveform 8a of a quadratic differential waveform of the output signal 3a of the second delay circuit 3. The first amplitude adjust circuit 11 outputs an output signal 11a (FIG. 11(e) and FIG. 13(e)) which is obtained by multiplying the amplitude of the output signal 8a (FIG. 10(h) and FIG. 12(h)) of the first adding circuit 8 by the arbitrary constant K1.

The maximum value selection circuit 9 outputs the maximum value MAX{2a, 3a, 4a} among the output signals 2a, 3a and 4a of the first, second and third delay circuits 2, 3 and 4 (FIG. 11(a) and FIG. 13(a)). The third subtracting circuit 12 outputs the signal 12a which is obtained by subtracting the output signal 3a of the second delay circuit 3 from the maximum value (FIG. 11(c) and FIG.13(c)). The minimum value selection circuit 10 outputs the minimum value MIN{2a, 3a, 4a} of the output signals 2a, 3a and 4a of the first, second and third delay circuits 2, 3 and 4 (FIG. 11(b) and FIG. 13(b)). The fourth subtracting circuit 13 outputs the signal 13a which is obtained by subtracting the output signal 3a of the second delay circuit 3 from the minimum value (FIG. 11(d) and FIG. 13(d)).

The intermediate value selection circuit 14 selects the intermediate value MID{11a, 12a, 13a} from the output signals 11a, 12a and 13a of the first amplitude adjust circuit 11, the third subtracting circuit 12 and the fourth subtracting circuit 13 (FIG. 11(e) and FIG. 13(e)). The second amplitude adjust circuit 15 outputs the output signal 15a which is obtained by multiplying the amplitude of the intermediate value signal 14a by the arbitrary constant K2. The second adding circuit 16 outputs the output signal 16a which is obtained by adding the output signal 15a of the second amplitude adjust circuit 15 and the output signal 3a of the second delay circuit 3 (FIG. 11(f) and FIG. 13(f)), through an output terminal OUT.

The output signal 8a of the first adding circuit 8 is an inverted signal indicative of increase/decrease in change of the range including the output signal 3a of the second delay circuit 3 and "time D1+time D2=time D3+time D4", and "time D1+time D2" is infinitely small, it is a quadratic differential signal of the signal 3a. From the relationship between the signals 2a, 3a and 4a, the output signal 12a of the third subtracting circuit 12 is positive or 0 (the case where 3a exists in the vicinity of the maximal portion and is the maximum value among the signals 2a, 3a and 4a), and the output signal 13a of the fourth subtracting circuit 13 is negative or 0 (the case where 3a exists in the vicinity of the minimal portion and is the minimum value among the signals 2a, 3a and 4a).

When, by appropriately setting the delay times D1 to D4, the signal waveform becomes a rising waveform of upward convex (the change is reduced in both positive and negative signs) in the range including the output signal 3a of the second delay circuit 3, therefore, the signal 8a (11a) is positive, the signal 12a positive, and the signal 13a negative, resulting in that the intermediate value signal of the three signals is positive. When the signal waveform becomes a rising waveform of downward convex (the change is increased in both positive and negative signs), the signal 8a (11a) is negative, the signal 12a positive, and the signal 13a negative, resulting in that the intermediate value signal of the three signals is negative.

When the signal waveform becomes a falling waveform of upward convex in the range including the output signal 3a, the signal 8a (11a) is positive, the signal 12a positive, and the signal 13a negative, resulting in that the intermediate value signal of the three signals is positive. When the signal waveform becomes a falling waveform of downward convex, the signal 8a (11a) is negative, the signal 12a positive, and the signal 13a negative, resulting in that the intermediate value signal of the three signals is negative.

In contrast, when the output signal 3a is in the vicinity of the maximal point of the signal waveform, the signal 8a (11a) is positive, the signal 12a is 0 (the output signal 3a is a maximum value signal), and the signal 13a is negative, resulting in that the intermediate value signal of the three signals is 0. When the signal 3a is in the vicinity of the minimal point of the signal waveform, the signal 8a (11a) is negative, the signal 12a is positive, and the signal 13a is 0 (the output signal 3a is a minimal value signal), resulting in that the intermediate value signal of the three signals is 0.

When the signal waveform becomes a linear rising waveform in the range including the input signal 1a and the signals 2a, 3a, 4a and 5a, the signal 8a (11a) is 0, the signal 12a positive, and the signal 13a negative, resulting in that the intermediate value signal of the three signals is 0. When the signal waveform becomes a linear falling waveform in a similar range, the signal 8a (11a) is 0, the signal 12a positive, and the signal 13a negative, resulting in that the intermediate value signal of the three signals is 0. When the signal waveform becomes a linear horizontal waveform in a similar range, the signal 8a (11a) is 0, the signal 12a is 0, and the signal 13a is 0, resulting in that the intermediate value signal of the three signals is 0.

As seen from the above, in the range including the output signal 3a of the second delay circuit 3, the output signal 14a of the intermediate value selection circuit 14 is positive when the signal waveform is upward convex, and negative when the signal waveform is downward convex (however, 0 in the maximal and minimal portions). When the arbitrary constant K2 of the second amplitude adjust circuit 15 is appropriately determined, therefore, the signal 15a which is added to the output signal 3a of the second delay circuit 3 can emphasize unevenness of the output signal 3a. In contrast, in the case where the signal has a linear waveform when the output signal 3a is in the vicinity of the maximal or minimal portion and in the range including the input signal 1a and the output signals 2a, 3a, 4a and 5a, the output signal 14a is 0. In a portion where it is not required to emphasize the change, therefore, the second adding circuit 16 outputs the output signal 3a of the second delay circuit 3 intact.

The timing when unevenness of the signal waveform is emphasized, that is, the rising and falling, times of the signal waveform can be controlled by adjusting the delay times D1, D2, D3 and D4.

Figure 14:
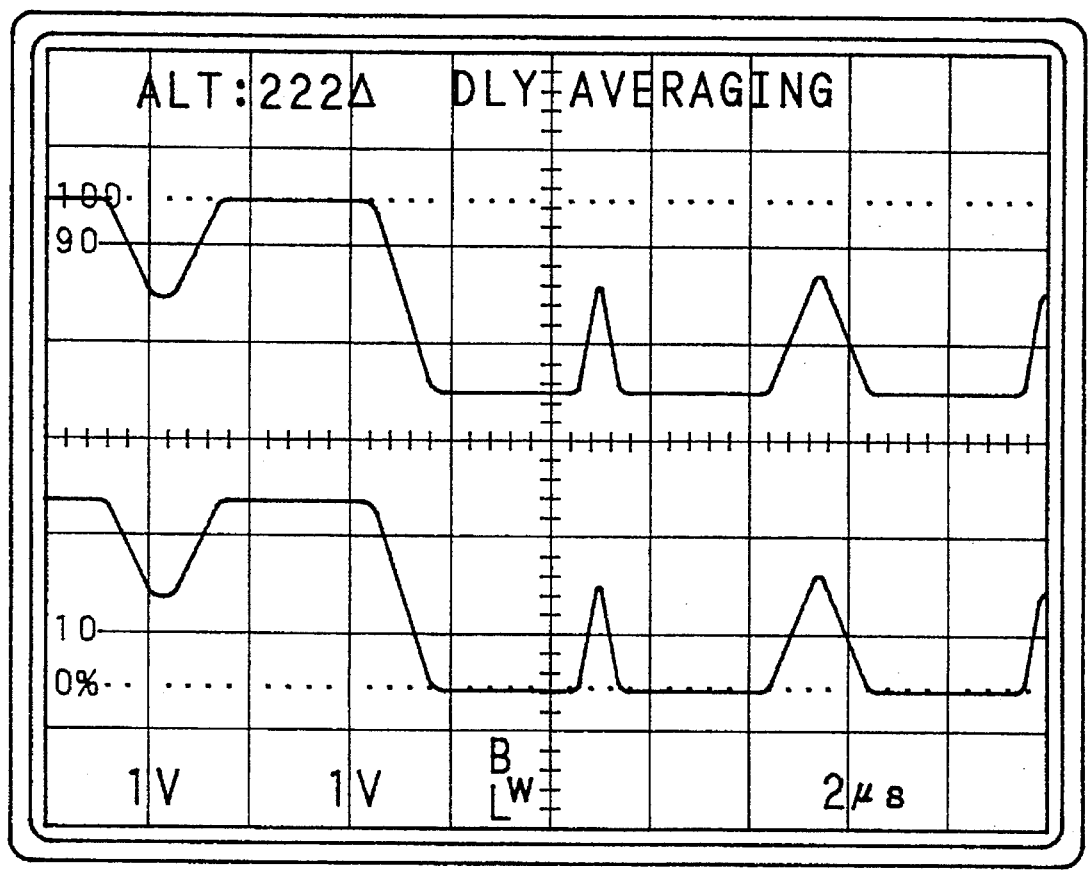
FIG. 14 is a waveform chart of inputs which are results of simulation of a waveform response improvement circuit according to the invention.
Figure 15:
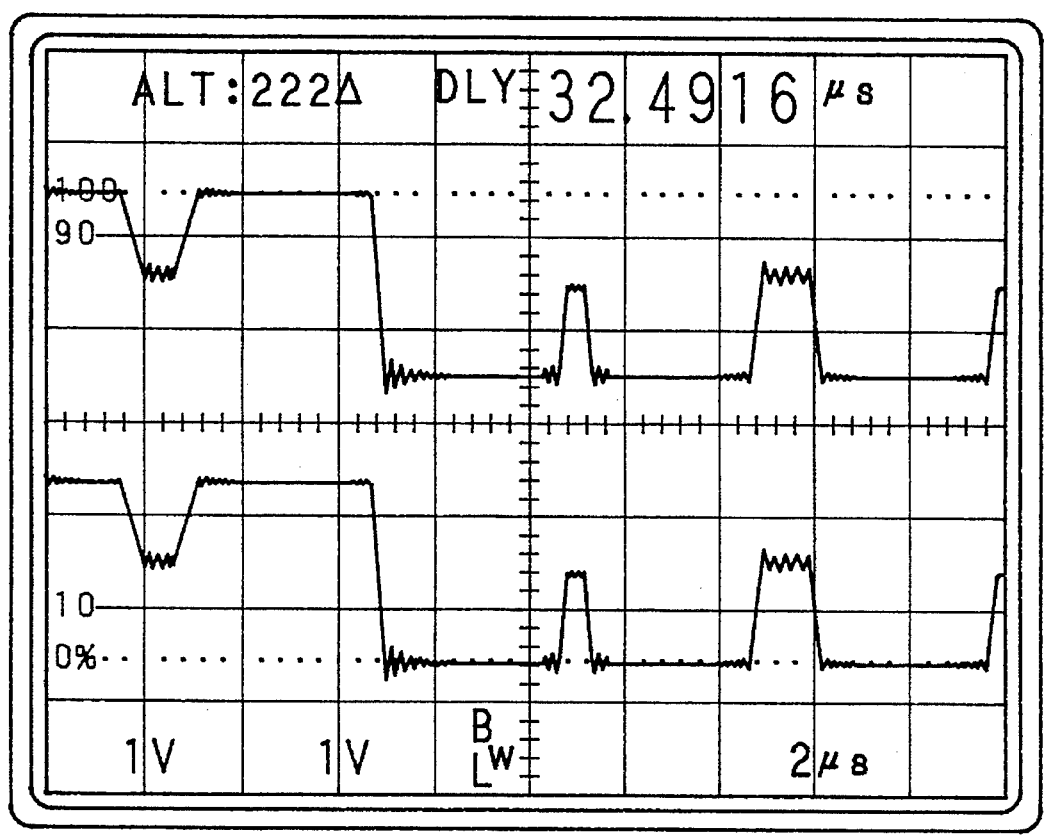
FIG. 15 is a waveform chart of outputs which are results of simulation of a waveform response improvement circuit according to the invention.

FIG. 14 and FIG. 15 are waveforms chart showing results of actual simulation. From these figures, it will be noted that, when the signals shown in FIG. 14 are inputted, the rising and falling are made steeper in the output signals shown in FIG. 15.

The configuration and operation of the second aspect of the waveform response improvement circuit of the invention are the same as those of the first aspect, except that the delay time D1 of the first delay circuit 2 is equal to the delay time D4 of the fourth delay circuit 5, and the delay time D2 of the second delay circuit 3 is equal to the delay time D3 of the third delay circuit 4. In this case, the waveforms of the output signals 12a and 13a of the third and fourth subtracting circuits 12 and 13 are laterally symmetric as shown in FIG. 11(c) and FIG. 11(d), and FIG. 13(c) and FIG. 13(d). The description of the other configuration and function will be omitted.

Figure 16:
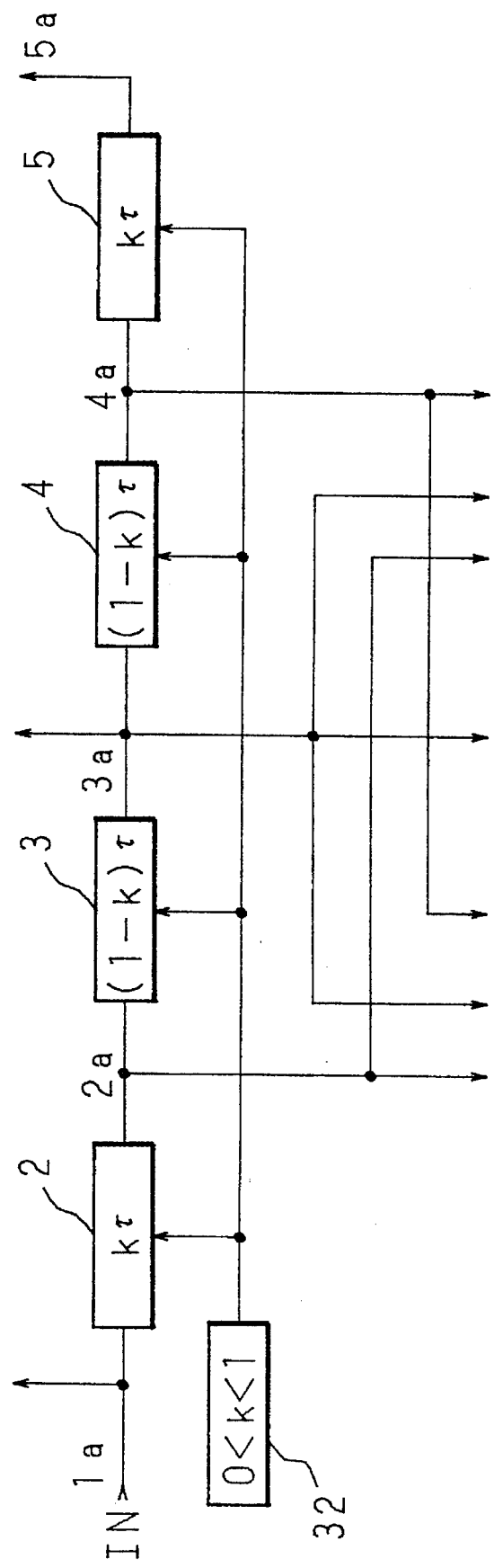
FIG. 16 is a block diagram showing a configuration example of a first delay circuit, a second delay circuit, a third delay circuit and a fourth delay circuit, and an adjustment control circuit of the third aspect of the waveform response improvement circuit of the invention.

FIG. 16 is a block diagram showing a configuration example of the first, delay circuit 2, the second delay circuit 3, the third delay circuit 4, the fourth delay circuit 5 and the adjustment controlling means 32 of the third aspect of the waveform response improvement circuit of the invention. The delay times D1 to D4 of the first to fourth delay circuits 2 to 5 are respectively set to be D1=kτ, D2=(1−k), D3=(1−k)τ and D4=kτ (0<k<1). When k is set by the adjustment controlling means 32, the delay times D1 to D4 are automatically set in the same manner as the second aspect of the invention. The other configuration and function are the same as those of the first aspect of the invention, and hence their description will be omitted.

As described above in detail, according to the first aspect of the waveform response improvement circuit of the invention, the rising and falling times of a waveform can arbitrarily be set. Furthermore, a preshoot and an overshoot are respectively added to the front and rear sides of a rising portion of an output signal, and a preshoot and an undershoot are respectively added to the front and rear sides of a falling portion of an output signal, thereby allowing an input signal to be shaped in a high quality. Therefore, the circuit is prevented from erroneously operating even when an input signal has a small amplitude, and decoloration is prevented from occurring even when an input signal has a small area.

According to the second aspect of the waveform response improvement circuit of the invention, it is possible to obtain an output waveform having the steepest rising/falling edge.

According to the third aspect of the waveform response improvement circuit of the invention, it is possible to arbitrarily change delay times of delaying means in an easy manner.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A waveform response improvement circuit which inputs an image signal and improves a waveform of said image signal, comprising:

first delaying means for outputting a signal which is obtained by delaying an input signal of said image signal by a first delay time;

second delaying means for outputting a signal which is obtained by delaying the output signal of said first delaying means by a second delay time;

third delaying means for outputting a signal which is obtained by delaying the output signal of said second delaying means by a third delay time;

fourth delaying means for outputting a signal which is obtained by delaying the output signal of said third delaying means by a fourth delay time;

first subtracting means for outputting a signal which is obtained by subtracting said input signal from the output signal of said second delaying means;

second subtracting means for outputting a signal which is obtained by subtracting the output signal of said fourth delaying means from the output signal of said second delaying means;

first adding means for outputting a signal which is obtained by adding the output signal of said first subtracting means and the output signal of said second subtracting means;

first amplitude adjusting means for outputting a signal which is obtained by adjusting an amplitude of the output signal of said first adding means;

maximum value selecting means for selecting a maximum value from the output signals of said first, second and third delaying means;

minimum value selecting means for selecting a minimum value from the output signals of said first, second and third delaying means;

third subtracting means for outputting a signal which is obtained by subtracting the output signal of said second delaying means from the output signal of said maximum value selecting means;

fourth subtracting means for outputting a signal which is obtained by subtracting the output signal of said second delaying means from the output signal of said minimum value selecting means;

intermediate value selecting means for selecting an intermediate value from the output signal of said first amplitude adjusting means, the output signal of said third subtracting means, and the output signal of said fourth subtracting means, and for outputting a signal of the intermediate value;

second amplitude adjusting means for outputting a signal which is obtained by adjusting an amplitude of the output signal of said intermediate value selecting means; and second adding means for adding the output signal of said second amplitude adjusting means and the output signal of said second delaying means to produce a resulting signal, and for outputting the resulting signal.

2. The waveform response improvement circuit as set forth in claim 1, wherein said first delay time set in said first delaying means is equal to said fourth delay time set in said fourth delaying means, and said second delay time set in said second delaying means is equal to said third delay time set in said third, delaying means.

3. The waveform response improvement circuit as set forth in claim 1, further comprising adjustment controlling means for setting delay times in said first, second, third and fourth delaying means.

4. A waveform response improvement method which inputs an image signal and improves a waveform of the image signal, comprising the steps of:

a first delaying step for delaying an input signal of said image signal by a first delay time;

a second delaying step for delaying the output signal of said first delaying step by a second delay time;

a third delaying step for delaying the output signal of said second delaying step by a third delay time;

a fourth delaying step for delaying the output signal of said third delaying means by a fourth delay time;

a first subtracting step for subtracting the input signal from the output signal of said second delaying step;

a second subtracting step for subtracting the output signal of said fourth delaying step from the output signal of said second delaying step;

a first adding step for adding the output signal of said first subtracting step and the output signal of said second subtracting step;

a first amplitude adjusting step for adjusting an amplitude of the output signal of said first adding step;

selecting a maximum value from the output signals of said first, second and third delaying steps;

selecting a minimum value from the output signals of said first, second and third delaying steps;

a third subtracting step for subtracting the output signal of said second delaying step from the output signal of said maximum value selecting step;

a fourth subtracting step for subtracting the output signal of said second delaying step from the output signal of said minimum value selecting step;

selecting an intermediate value from the output signal of said first amplitude adjusting step, the output signal of said third subtracting step, and the output signal of said fourth subtracting step, and for outputting a signal of the intermediate value;

a second amplitude adjusting step for adjusting an amplitude of the output signal of said intermediate value selecting step; and second adding step for adding the output signal of said second amplitude adjusting step and the output signal of said second delaying step to produce a resulting signal, and for outputting the resulting signal.

5. The waveform response improvement method as set forth in claim 4, wherein said first delay time set in said first delaying step is equal to said fourth delay time set in said fourth delaying step, and said second delay time set in said second delaying step is equal to said third delay time set in said third delaying step.

6. The waveform response improvement method as set forth in claim 4, further comprising the step of:

an adjustment controlling step for setting respective delay times in said first, second, third and fourth delaying steps.

7. An apparatus for shortening rising and falling times of an input signal, comprising:

means for delaying the input signal by first, second, third, and fourth delay times and outputting first, second, third and fourth delayed signals;

first means for subtracting the input signal from said second delayed signal;

second means for subtracting said fourth delayed signal from said second delayed signal;

first means for combining the outputs of said first and second means for subtracting;

minimum value selection means for selecting a minimum value from said first, second and third delayed signals;

maximum value selection means for selecting a maximum value from said first, second and third delayed signals;

intermediate value selection means for selecting an intermediate value from the outputs of said first means for combining, said minimum value selection means and said maximum value selection means; and second means for combining the output of said intermediate value selection means and said second delayed signal, wherein the output of said second means for combining shortens the rising and falling times of the input signal.

8. The apparatus of claim 7, further comprising:

an amplifier, interposed between said first means for combining and the intermediate value selection means, said amplifier amplifying the output of said first means for combining by a constant.

9. The apparatus of claim 7, further comprising:

an amplifier, interposed between said intermediate value selection means and said second means for combining, said amplifier amplifying the output of said intermediate value selection means by a constant.

10. The apparatus of claim 7, wherein the first and fourth delay times are substantially equal and wherein the second and third delay times are substantially equal.

11. The apparatus of claim 7, further comprising:

means for controlling the rising and falling times of the input signal by adjusting the first, second, third, and fourth delay times.

12. A method for shortening rising and falling times of an input signal, comprising the steps of:

delaying the input signal by first, second, third, and fourth delay times and outputting first, second, third and fourth delayed signals;

a first subtracting step for subtracting the input signal from said second delayed signal;

a second subtracting step for subtracting said fourth delayed signal from said second delayed signal;

a first combining step for combining the outputs of said first and second subtracting steps;

a minimum value selection step for selecting a minimum value from said first, second and third delayed signals;

a maximum value selection step for selecting a maximum value from said first, second and third delayed signals;

an intermediate value selection step for selecting an intermediate value from the outputs of said first combining step, said minimum value selection step and said maximum value selection step; and a second combining step for combining the output of said intermediate value selection step and said second delayed signal, wherein the output of said second combining step shortens the rising and falling times of the input signal.

13. The method of claim 12 further comprising the step of:

an amplifying step, interposed between the first combining step and the intermediate value selection step, said amplifying step amplifying the output of said first combining step by a constant.

14. The method of claim 12, further comprising the step of:

an amplifying step, interposed between said intermediate value selection step and said second combining step, said amplifying step amplifying the output of said intermediate value selection step by a constant.

15. The method of claim 12 wherein the first and fourth delay times are substantially equal and wherein the second and third delay times are substantially equal.

16. The method of claim 12, further comprising the step of:

controlling the rising and falling times of the input signal by adjusting the first, second, third and fourth delay times.

\* \* \* \* \*